United States Patent
Boic et al.

(10) Patent No.: US 7,694,006 B2
(45) Date of Patent: Apr. 6, 2010

(54) SYSTEM AND METHOD FOR DISTRIBUTING MEDIA DATA

(75) Inventors: Milko Boic, Bellevue, WA (US); Jeff Ayars, North Bend, WA (US); Greg Wright, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 264 days.

(21) Appl. No.: 11/829,616

(22) Filed: Jul. 27, 2007

(65) Prior Publication Data

US 2009/0031007 A1    Jan. 29, 2009

(51) Int. Cl.
  *G06F 13/00* (2006.01)
(52) U.S. Cl. .................. 709/231; 709/219; 709/250
(58) Field of Classification Search .......... 709/217, 709/219, 223, 224, 230, 231, 232, 250; 719/328, 719/329
See application file for complete search history.

(56) References Cited

U.S. PATENT DOCUMENTS

| | | | |
|---|---|---|---|
| 5,790,551 A | 8/1998 | Chan | |
| 6,848,002 B1 * | 1/2005 | Detlef | 709/231 |
| 7,133,600 B1 * | 11/2006 | Boyle | 386/125 |
| 2002/0116517 A1 * | 8/2002 | Hudson et al. | 709/231 |
| 2005/0008240 A1 * | 1/2005 | Banerji et al. | 382/238 |
| 2006/0067585 A1 * | 3/2006 | Pace | 382/243 |
| 2006/0095472 A1 | 5/2006 | Krikorian et al. | |
| 2006/0203176 A1 * | 9/2006 | Mizuyoshi | 349/155 |
| 2006/0230176 A1 * | 10/2006 | Dacosta | 709/235 |
| 2008/0301739 A1 * | 12/2008 | Goldeen et al. | 725/88 |

OTHER PUBLICATIONS

International Search Report with Written Opinion, dated Oct. 9, 2008, received in international patent application No. PCT/US08/70859, 9 pgs.

* cited by examiner

*Primary Examiner*—Viet Vu
(74) *Attorney, Agent, or Firm*—Axios Law; Adam L. K. Philipp (57) ABSTRACT

A method and computer program product for receiving a plurality of media data file portions on a client electronic device from a remote distribution server computer. Each media data file portion is associated with a media data stream. A user is allowed to select a specific media data file portion for rendering. The specific media data file portion is chosen from the plurality of media data file portions. Upon the user selecting the specific media data file portion, at least a portion of the specific media data file portion is rendered and a specific media data stream associated with the specific media data file portion is obtained from an on-demand media server computer.

26 Claims, 5 Drawing Sheets

SYSTEM AND METHOD FOR DISTRIBUTING MEDIA DATA

TECHNICAL FIELD

This disclosure relates to media data and, more particularly, to receiving media data from a plurality of sources.

BACKGROUND

The distribution of electronic media data (e.g., music, videos, movies, and television shows) may be accomplished using various methodologies. For example, entire media data files may be transferred from a media data server to a client electronic device. Alternatively, a media data stream may be established between the media data server and the client electronic device.

Unfortunately, each methodology has its own shortcomings. Specifically, for systems in which the file is transferred to the client electronic device, the entire file is often required to be transferred prior to initiating rendering of the media data file. Further, for systems in which a media data stream is established between the media data server and the client electronic device, a considerable amount of time (e.g., >10 seconds) may be required to establish a connection with the media data server, often resulting in a less-than-optimal user experience.

SUMMARY OF DISCLOSURE

In a first implementation, a method includes receiving a plurality of media data file portions on a client electronic device from a remote distribution server computer. Each media data file portion is associated with a media data stream. A user is allowed to select a specific media data file portion for rendering. The specific media data file portion is chosen from the plurality of media data file portions. Upon the user selecting the specific media data file portion, at least a portion of the specific media data file portion is rendered and a specific media data stream associated with the specific media data file portion is obtained from an on-demand media server computer.

One or more of the following features may be included. Receiving the plurality of media data file portions on the client electronic device from the remote distribution server computer may include receiving the plurality of media data file portions on the client electronic device from the remote distribution server computer during a low-bandwidth usage time frame.

The specific media data file portion may be an initial chronological portion of a larger media data file. The specific media data stream may be a stream of a residual chronological portion of the larger media data file. The specific media data file portion may be chronologically sized so that a rendering time of the specific media data file portion is at least as long as an anticipated time required to obtain the specific media data stream.

At least a portion of the specific media data stream may be rendered. Rendering at least a portion of the specific media data file portion and at least a portion of the specific media data stream may include: processing the specific media data file portion to generate a first normalized packetized stream; processing the specific media data stream to generate a second normalized packetized stream; and combining, using a packet loss tolerant stitching algorithm, at least a portion of the first normalized packetized stream and at least a portion of the second normalized packetized stream to generate a loss-compensated media data stream. Rendering at least a portion of the specific media data file portion and at least a portion of the specific media data stream may further include: rendering the loss-compensated media data stream on the client electronic device. The loss-compensated media data stream may include an A/V loss-compensated media data stream.

The client electronic device may be chosen from the group consisting of: a personal computer; a laptop computer; a notebook computer; a personal media device; a personal digital assistant; a data-enabled cellular telephone; a television; a cable box; an internet radio; and a dedicated network device.

The specific media data file portion may be sampled at a first bit rate and the specific media data stream may be sampled at a second bit rate. The first bit rate may be less than the second bit rate.

The specific media data file portion may be obtained from the remote distribution server computer using a networking protocol chosen from the group consisting of: a Multimedia Messaging Service (MMS) protocol; a HyperText Transfer Protocol (HTTP); a FLUTE protocol; and a Really Simple Syndication (RSS) protocol. The specific media data stream may be obtained from the on-demand media server computer using a networking protocol chosen from the group consisting of: a Real Time Streaming Protocol (RTSP); a Real-time Transport Protocol (RTP); and a User Datagram Protocol (UDP).

The specific media data file portion may include metadata that defines a location of the specific media data stream. The remote distribution server computer and the on-demand media server computer may be a single server computer.

In another implementation, a computer program product resides on a computer readable medium that has a plurality of instructions stored on it. When executed by a processor, the instructions cause the processor to perform operations including receiving a plurality of media data file portions on a client electronic device from a remote distribution server computer. Each media data file portion is associated with a media data stream. A user is allowed to select a specific media data file portion for rendering. The specific media data file portion is chosen from the plurality of media data file portions. Upon the user selecting the specific media data file portion, at least a portion of the specific media data file portion is rendered and a specific media data stream associated with the specific media data file portion is obtained from an on-demand media server computer.

One or more of the following features may be included. Receiving the plurality of media data file portions on the client electronic device from the remote distribution server computer may include receiving the plurality of media data file portions on the client electronic device from the remote distribution server computer during a low-bandwidth usage time frame.

The specific media data file portion may be an initial chronological portion of a larger media data file. The specific media data stream may be a stream of a residual chronological portion of the larger media data file. The specific media data file portion may be chronologically sized so that a rendering time of the specific media data file portion is at least as long as an anticipated time required to obtain the specific media data stream.

At least a portion of the specific media data stream may be rendered. Rendering at least a portion of the specific media data file portion and at least a portion of the specific media data stream may include: processing the specific media data file portion to generate a first normalized packetized stream; processing the specific media data stream to generate a second normalized packetized stream; and combining, using a packet loss tolerant stitching algorithm, at least a portion of the first normalized packetized stream and at least a portion of the second normalized packetized stream to generate a loss-compensated media data stream. Rendering at least a portion of the specific media data file portion and at least a portion of the specific media data stream may further include: rendering the loss-compensated media data stream on the client electronic device. The loss-compensated media data stream may include an A/V loss-compensated media data stream.

The client electronic device may be chosen from the group consisting of: a personal computer; a laptop computer; a notebook computer; a personal media device; a personal digital assistant; a data-enabled cellular telephone; a television; a cable box; an internet radio; and a dedicated network device.

The specific media data file portion may be sampled at a first bit rate and the specific media data stream may be sampled at a second bit rate. The first bit rate may be less than the second bit rate.

The specific media data file portion may be obtained from the remote distribution server computer using a networking protocol chosen from the group consisting of: a Multimedia Messaging Service (MMS) protocol; a HyperText Transfer Protocol (HTTP); a FLUTE protocol; and a Really Simple Syndication (RSS) protocol. The specific media data stream may be obtained from the on-demand media server computer using a networking protocol chosen from the group consisting of: a Real Time Streaming Protocol (RTSP); a Real-time Transport Protocol (RTP); and a User Datagram Protocol (UDP).

The specific media data file portion may include metadata that defines a location of the specific media data stream. The remote distribution server computer and the on-demand media server computer may be a single server computer.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
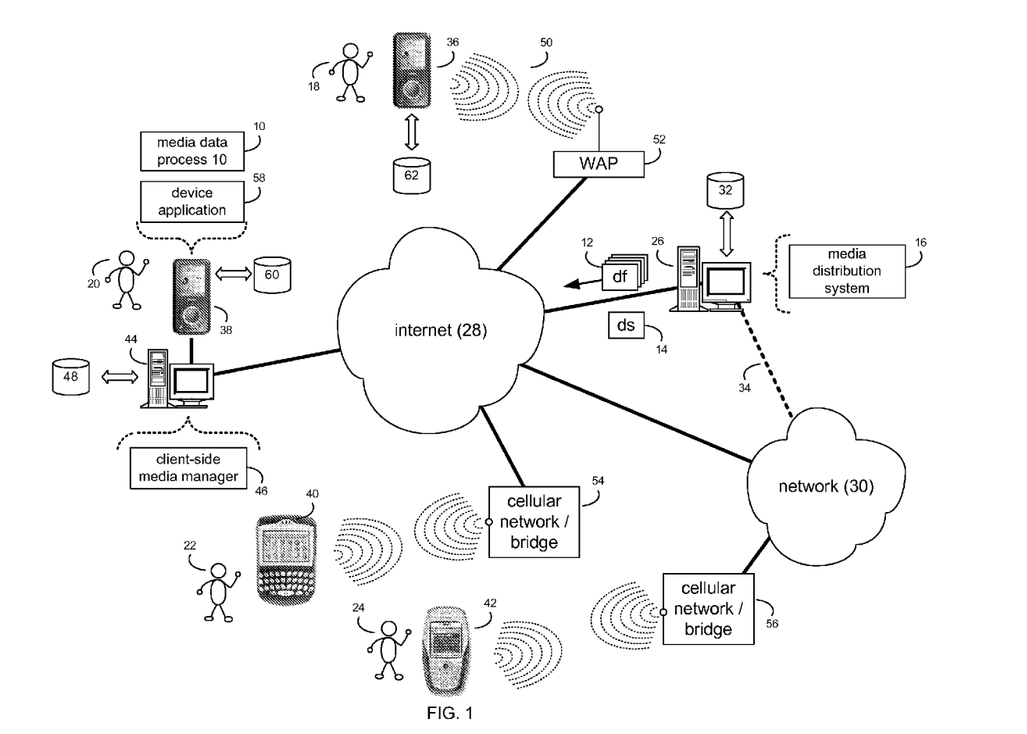
FIG. 1 is a diagrammatic view of a media data process executed on a client electronic device coupled to a distributed computing network.

Referring to FIG. 1, there is shown media data process 10. As will be discussed below in greater detail, media data process 10 may receive plurality of media data file portions 12 and specific media data stream 14 from media distribution system 16. Media data process 10 may process a specific media data file portion (chosen from the plurality of media data file portions 12) and specific media data stream 14 to generate a first and second normalized packetized stream, which may be combined, using a packet loss-tolerant stitching algorithm, to generate a loss-compensated media data stream.

Examples of plurality of media data file portions 12 and/or specific media data stream 14 may include, but are not limited to, digitally-encoded audio and/or video media data that may be compressed using known compression techniques. Examples of such compression techniques may include but are not limited to MPEG-1, MPEG-2, MPEG-4, H.263, H.264, Advanced Audio Coding, and other techniques promulgated by e.g., the International Standards Organization and the Motion Picture Experts Group.

Media distribution system 16 may provide media data (i.e., in the form of plurality of media data file portions 12 and/or specific media data stream 14) to a plurality of users (e.g., users 18, 20, 22, 24). Examples of media distribution system 16 may include but are not limited to the Rhapsody™ service offered by RealNetworks, Inc. of Seattle, Wash.

Media distribution system 16 may be a server application that resides on and is executed by server computer 26 that is connected to network 28 (e.g., the Internet). Server computer 26 may be a web server running a network operating system, examples of which may include but are not limited to Microsoft Windows XP Server™, Novell Netware™, or Redhat Linux™. Examples of server computer 26 may include but are not limited to: a personal computer, a server computer, and a plurality of server computers. For example, server computer 26 may include a remote distribution server computer (not shown) for distributing plurality of specific media data file portions 12 and an on-demand media server (not shown) for providing specific media data stream 14.

Server computer 26 may also execute a web server application, examples of which may include but are not limited to Microsoft IIS™, Novell Webserver™, or Apache Webserver™, that allows for HTTP (i.e., HyperText Transfer Protocol) access to server computer 26 via network 28. Network 28 may be connected to one or more secondary networks (e.g., network 30), such as: a local area network; a wide area network; or an intranet, for example.

The instruction sets and subroutines of media distribution system 16, which may be stored on storage device 32 coupled to server computer 26, may be executed by one or more processors (not shown) and one or more memory architectures (not shown) incorporated into server computer 26. Additionally, plurality of specific media data file portions 12 and/or specific media data stream 14 available from media distribution system 16 may be stored on e.g., storage device 32 coupled to server computer 26. Storage device 32 may include but is not limited to a hard disk drive, a tape drive, an optical drive, a RAID array, a random access memory (RAM), or a read-only memory (ROM).

Users 18, 20, 22, 24 may access media distribution system 16 through e.g., network 28 and/or secondary network 30. Further, server computer 26 (i.e., the computer that executes media distribution system 16) may be connected to network 28 through secondary network 32, as illustrated with phantom link line 34.

Media distribution system 16 may be accessed through various client electronic devices, examples of which may include, but are not limited to: personal media device 36; personal media device 38, personal digital assistant 40; data-enabled cellular telephone 42; personal computers (not shown); laptop computers (not shown); notebook computers (not shown); televisions (not shown); cable boxes (not shown); internet radios (not shown); or dedicated network devices (e.g., A Roku™ Soundbridge M500, M1000 and M2000; not shown), for example.

Media distribution system 16 may be accessed directly or may be accessed indirectly (e.g., through a client computer) by the client electronic devices (e.g., personal media device 36; personal media device 38, personal digital assistant 40; data-enabled cellular telephone 42). For example, users 18, 22, 24 are shown directly accessing media distribution system 16 through personal media device 36, personal digital assistant 40, and data-enabled cellular telephone 42 (respectively). Conversely, user 20 is shown indirectly accessing media distribution system 16 through personal media device 38 via client computer 44.

The client electronic devices (e.g., personal media device 36; personal media device 38, personal digital assistant 40; data-enabled cellular telephone 42) may be wirelessly-coupled or hardwired to network 28, 30 (and, therefore, media distribution system 16).

For example, personal media device 38 is shown hardwired to client computer 44, which is shown directly coupled to network 28 via a hardwired network connection. Client computer 44 may execute a client-side media manager 46 (examples of which may include but are not limited to Microsoft Internet Explorer™ available from Microsoft Inc, of Redmond, Wash., Rhapsody™ client & RealPlayer™ client available from RealNetworks, Inc. of Seattle, Wash., and a specialized interface) that allows e.g., user 20 to access and configure media distribution system 16 via network 28 (or network 30). Client computer 44 may execute an operating system, examples of which may include but are not limited to Microsoft Windows XP™ and Redhat Linux™.

The instruction sets and subroutines of client-side media manager 46, which may be stored on a storage device 48 coupled to client computer 44, may be executed by one or more processors (not shown) and one or more memory architectures (not shown) incorporated into client computer 44. Storage device 48 may include but is not limited to a hard disk drive, a tape drive, an optical drive, a RAID array, a random access memory (RAM), a read-only memory (ROM), compact flash (CF) storage devices, secure digital (SD) storage devices, and memory stick storage devices.

As discussed above, the client electronic devices may be wirelessly-coupled to network 30, 32 (and, therefore, media distribution system 16). For example, personal media device 36 is shown wirelessly coupled to network 28 via a wireless communication channel 50 established between personal media device 36 and wireless access point (i.e., WAP) 52, which is shown directly coupled to network 28. WAP 52 may be, for example, an IEEE 802.11a, 802.11b, 802.11g, Wi-Fi, and/or Bluetooth device that is capable of establishing communication channel 50 between personal media device 36 and WAP 52.

As is known in the art, the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Additionally, personal digital assistant 40 is shown wirelessly coupled to network 28 via cellular/network bridge 54 (which is shown directly coupled to network 28); and data-enabled cellular telephone 42 is shown wirelessly coupled to network 30 via cellular/network bridge 56 (which is shown directly coupled to network 30).

Client Electronic Devices

As discussed above, examples of client electronic devices may include but are not limited to personal media devices 36, 38, personal digital assistant 40, and data-enabled cellular telephone 42. Accordingly, while the following disclosure is directed towards personal media device 38, it is understood that the following disclosure may be equally applied to any client electronic device (including personal media device 36, personal digital assistant 40, cellular telephone 42, televisions (not shown); cable boxes (not shown); internet radios (not shown); and dedicated network devices (not shown).

Figure 2:
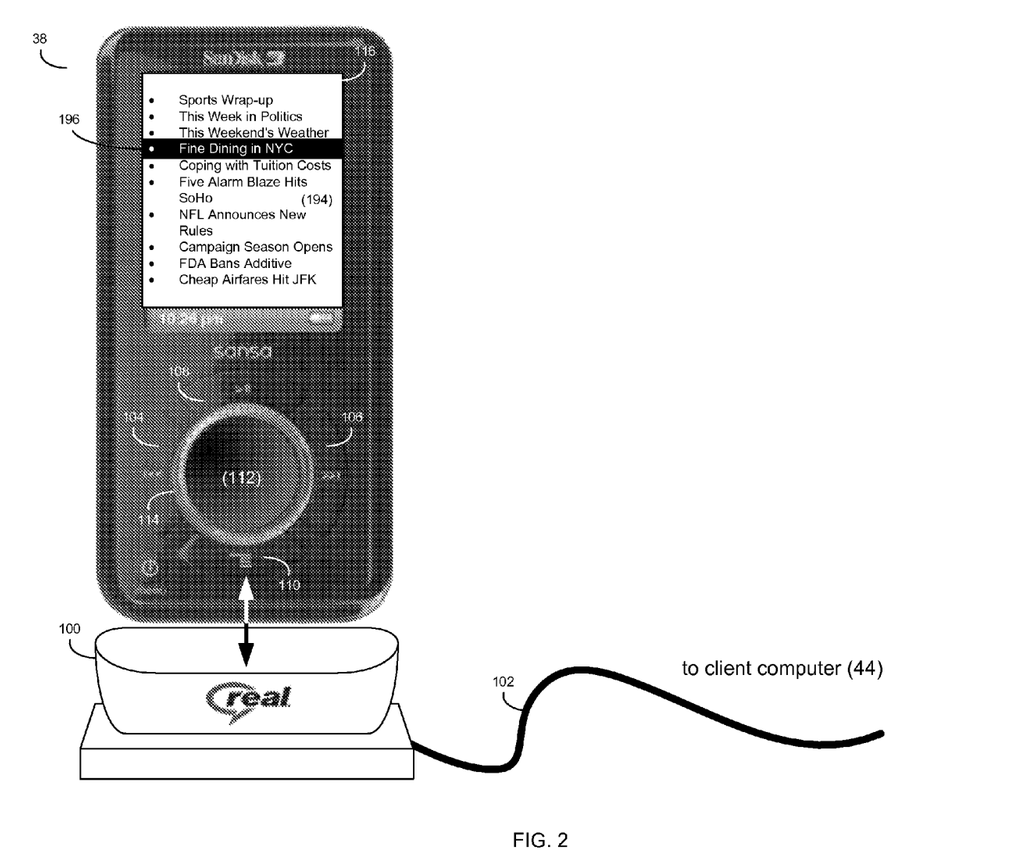
FIG. 2 is an isometric view of the client electronic device of FIG. 1.

Referring also to FIG. 2, personal media device 38 may be connected to e.g., client computer 44 via a docking cradle 100. Typically, personal media device 38 includes a bus interface (to be discussed below in greater detail) that couples personal media device 38 to docking cradle 100. Docking cradle 100 may be coupled (with cable 102) to e.g., a Universal Serial Bus (i.e., USB) port, a serial port, or an IEEE 1394 (i.e., FireWire) port included within client computer 44. For example, the bus interface included within personal media device 38 may be a USB interface, and docking cradle 100 may function as a USB hub (i.e., a plug-and-play interface that allows for "hot" coupling and uncoupling of personal media device 38 and docking cradle 100).

Client computer 44 may function as an Internet gateway for personal media device 38. For example, through the use of e.g., the universal plug and play protocol (i.e., UPnP), personal media device 38 may use client computer 44 to access media distribution system 16 via network 28 (and network 30) and obtain plurality of specific media data file portions 12 and/or specific media data stream 14. Specifically, upon receiving a request for media distribution system 16 from personal media device 38, client computer 44 (acting as an internet client on behalf of personal media device 38), may request the appropriate web page/service from server computer 26 (i.e., the computer that executes media distribution system 16). When the requested web page/service is returned to client computer 44, client computer 44 may relate the returned web page/service to the original request (placed by personal media device 38) and may forward the web page/service to personal media device 38. Accordingly, client computer 44 may function as a conduit for coupling personal media device 38 to server computer 26 and, therefore, media distribution system 16.

Figure 3:
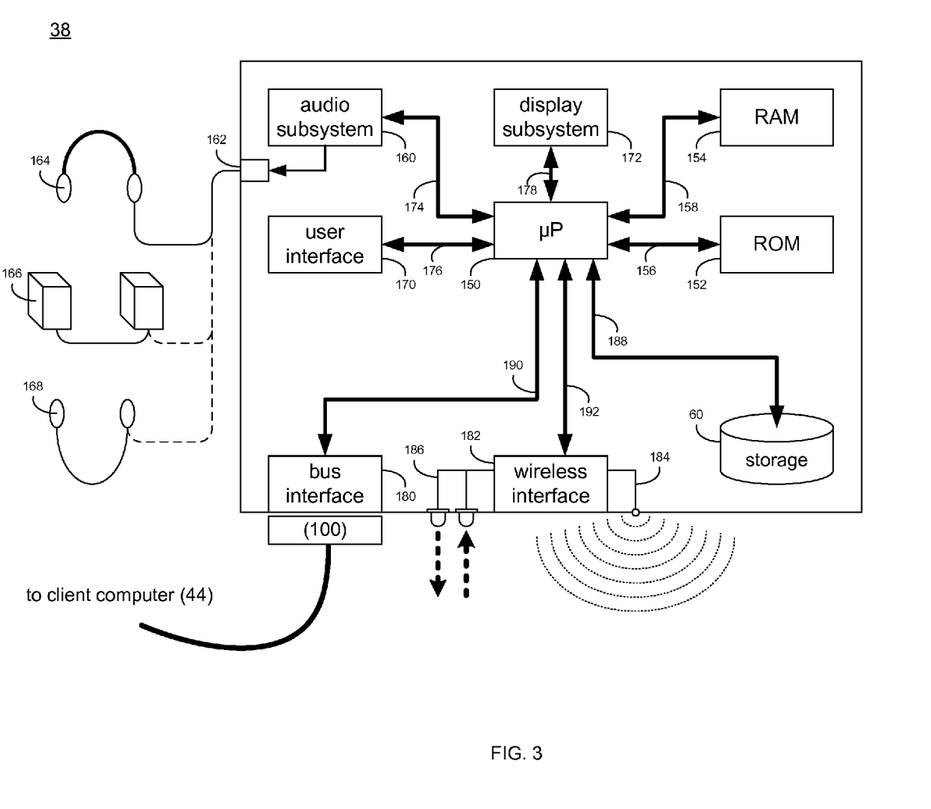
FIG. 3 is a diagrammatic view of the client electronic device of FIG. 1.

Referring also to FIG. 3, a diagrammatic view of personal media device 38 is shown. Personal media device 38 may include microprocessor 150 (e.g., an ARM™ microprocessor produced by Intel Corporation of Santa Clara, Calif.), non-volatile memory (e.g., read-only memory 152), and volatile memory (e.g., random access memory 154); each of which may be interconnected via one or more data/system buses 156, 158. Personal media device 38 may also include an audio subsystem 160 for providing e.g., an analog audio signal to an audio jack 162 for removably engaging e.g., a headphone assembly 164, a remote speaker assembly 166, or an ear bud assembly 168, for example. Alternatively, personal media device 38 may be configured to include one or more internal audio speakers (not shown).

Personal media device 38 may execute a device application 58 (examples of which may include but are not limited to Rhapsody™ client, RealPlayer™ client, or a specialized interface). Personal media device 38 may run an operating system, examples of which may include but are not limited to Microsoft Windows CE™, Redhat Linux™, Palm OS™, or a device-specific (i.e., custom) operating system.

The instruction sets and subroutines of device application 58, which may be stored on storage device 60 coupled to personal media device 38, may be executed by one or more processors (not shown) and one or more memory architectures (not shown) incorporated into personal media device 38. Storage device 60 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

Media data process 10 may be a portion of and/or incorporated within device application 58. Alternatively, media data process 10 may be a functionality (e.g., a plugin) that operates in conjunction with device application 58. Accordingly, the instruction sets and subroutines of media data process 10, which may be stored on storage device 60 coupled to personal media device 38, may be executed by one or more processors (not shown) and one or more memory architectures (not shown) incorporated into personal media device 38.

Personal media device 38 may also include user interface 170 and display subsystem 172. User interface 170 may receive data signals from various input devices included within personal media device 38, examples of which may include (but are not limited to): backward skip switch 104; forward skip switch 106; play/pause switch 108; menu switch 110; selector switch 112; and wheel assembly 114, for example. Display subsystem 172 may provide display signals to display panel 116 included within personal media device 38. Display panel 116 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

As discussed above, personal media device 38 may include bus interface 180 for interfacing with e.g., client computer 44 via docking cradle 100. Additionally and as discussed above, personal media device 38 may be wirelessly coupled to network 28 (and/or other personal media devices) via e.g., a wireless communication channel 50 established between personal media device 38 and e.g., WAP 52. Accordingly, personal media device 38 may include a wireless interface 182 for wirelessly-coupling personal media device 38 to network 28 (or network 30) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device. Further and as discussed above, personal media device 38 may include a storage device 60 for storing the instruction sets and subroutines of device application 58 and/or media data process 10. Additionally, storage device 60 may be used to temporarily or permanently store media data (e.g., plurality of media data file portions 12 and/or specific media data stream 14) downloaded from media distribution system 16.

Storage device 60, bus interface 180, and wireless interface 182 may each be coupled with microprocessor 150 via one or more data/system buses 188, 190, 192 (respectively). As discussed above, media distribution system 16 may distribute media data to users 18, 20, 22, 24 such that the media data distributed may be in the form of plurality of specific media data file portions 12 and/or specific media data stream 14.

Media Data Process

As discussed above, media data process 10 may receive specific media data file portion (which is included within plurality of media data file portions 12) and specific media data stream 14 from media distribution system 16. Media data process 10 may process the specific media data file portion (chosen from plurality of media data file portions 12) and specific media data stream 14 to generate first and second normalized packetized streams, which may be combined, using a packet loss tolerant stitching algorithm, to generate a loss-compensated media data stream.

Figure 4:
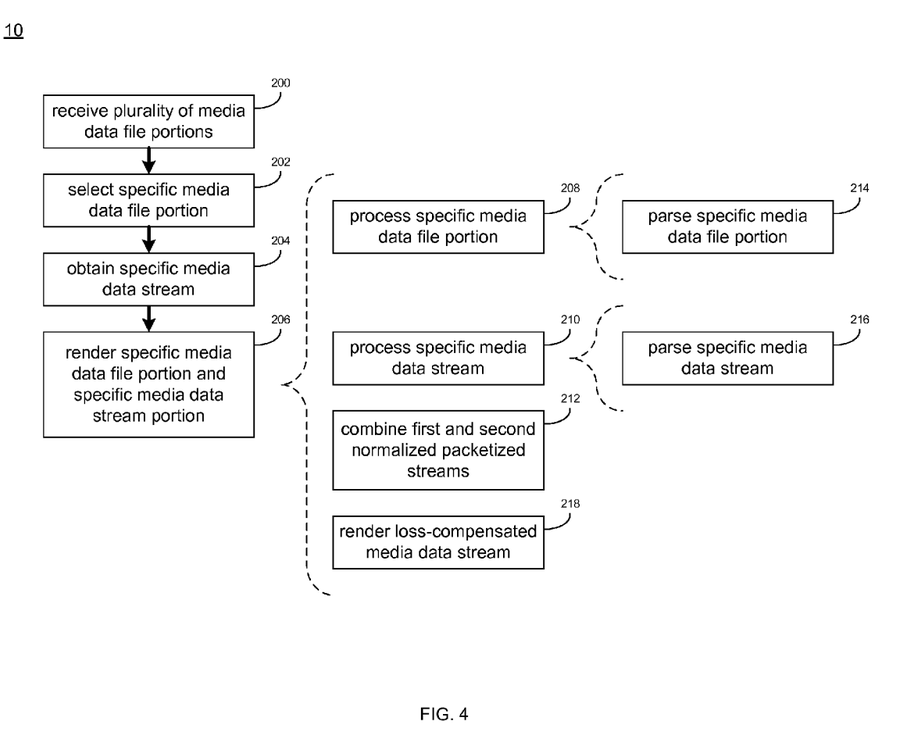
FIG. 4 is a flowchart of the media data process of FIG. 1.

Referring also to FIG. 4, media data process 10 may download and receive 200 plurality of media data file portions 12 on a client electronic device (e.g., personal media device 36) from a remote distribution server computer (e.g., server computer 26).

Plurality of media data file portions 12 may be stored upon storage device 62 coupled to personal media device 36. Storage device 62 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

As discussed above, examples of client electronic devices may include but are not limited to personal media devices 36, 38, personal digital assistant 40, and data-enabled cellular telephone 42. Accordingly, while the following disclosure is directed towards personal media device 36, it is understood that the following disclosure may be equally applied to any client electronic device (including personal media device 38, personal digital assistant 40, cellular telephone 42, televisions (not shown); cable boxes (not shown); internet radios (not shown); and dedicated network devices (not shown).

Each of plurality of media data file portions 12 may be an initial chronological portion of a larger media data file. For example, each of media data file portions 12 may be the first thirty seconds of a media data file. Examples of the various types of media data files may include but are not limited to musical tracks (e.g., MP3 files), musical videos, books-on-tape audio tracks, feature-length films, televisions shows, news clips, news broadcasts, personal videos (e.g., youtube™ videos), business presentations, animations, slideshows, sports broadcasts, sports clips, training videos, and podcasts.

The plurality of media data file portions 12 may be received 200 by personal media device 36 from remote distribution server computer (e.g., server computer 36) during a low-bandwidth usage time frame. For example, assume that personal media device 36 is continuously wirelessly coupled, via wireless communication channel 50, to network 28. As network traffic (and, therefore, bandwidth usage) tends to be lower in the middle of the night, personal media device 36 may receive 200 plurality of media data file portions 12 from server computer 36 in the middle of the night. Accordingly, if user 18 subscribes to a news website (e.g., www.foxnews.com; www.cnn.com; www.reuters.com), the remote distribution server computer associated with that website may push ten media data file portions (i.e., plurality of media data file portions 12) to personal media device 36. These ten media data file portions may represent the first thirty seconds (i.e., the initial chronological portion) of each of the top ten new stories, which may each be 3:00 long. Upon user 18 accessing personal media device 36 at e.g., 7:00 a.m., media data process 10 may present to user 16 (on display screen 116) an icon for each of the ten media data file portions received 200 on personal media device 36 from server computer 26.

Media data process 10 may allow user 18 to select 202 a specific media data file portion (chosen from plurality of media data file portions 12) for rendering on personal media device 26. For example, user 16 may utilize wheel assembly 114 to scroll (i.e., upward and downward) through menu 194

(i.e., which itemizes plurality of media data file portions 12) and may select 202 specific media data file portion 196 (from plurality of media data file portions 12) using e.g., selector switch 112.

Specific media data file portion 196 may be obtained from a remote distribution server computer (e.g., server computer 26) using a networking protocol chosen from the group consisting of: a Multimedia Messaging Service (MMS) protocol; a HyperText Transfer Protocol (HTTP); a FLUTE protocol; and a Really Simple Syndication (RSS) protocol.

Each available media data file portion (e.g., as represented by "Sports Wrap-up", "This Week in Politics", "This Weekend's Weather", "Fine Dining in NYC", "Coping with Tuition Costs", "Five Alarm Blaze Hits SoHo", "NFL Announces New Rules", "Campaign Season Opens", "FDA Bans Additive", "Cheap Airfares Hit JFK" itemized within display panel 116) may be associated with a specific media data stream (e.g., specific media data stream 14). For example, each of plurality of media data file portions 12 may include metadata that defines the location of a related specific media data stream. For example, the metadata may define a uniform resource locator (URL) that points to the specific media data stream.

As discussed above, each of plurality of media data file portions 12 may be an initial chronological portion of a larger media data file. Further, the specific media data stream (e.g., specific media data stream 14) associated with the specific media data file portion (e.g., specific media data file portion 196) may be a stream of a residual chronological portion of the larger media data file. For example, if specific media data file portion 196 is the first thirty seconds of a three minute news story entitled "Fine Dining in NYC", specific media data stream 14 may be the residual two and a half minutes of the "Fine Dining in NYC" news story. Accordingly, by combining the first thirty seconds of the "Fine Dining in NYC" news story (as included within specific media data file portion 196) with the last two and a half minutes of the same story (as included within specific media data stream 14), the entire three minute story may be available to personal media device 36.

Upon the user selecting 202 the specific media data file portion, media data process 10 may obtain 204 a specific media data stream associated with the specific media data file portion from an on-demand media server computer (e.g., server computer 26) and may render at least a portion of specific media data file portion 196. For example, upon user 18 selecting "Fine Dining in NYC" (which is descriptive of specific media data file portion 196 stored upon storage device 62), media data process 10 may obtain 204 the specific media data stream (e.g., specific media data stream 14) that is associated with specific media data file portion 196 and may render at least a portion of specific media data file portion 196. Accordingly and continuing with the above-described example, personal media device 36 may access server computer 26 (via e.g., wireless communication channel 50, network 28 and/or network 30) and obtain 204 specific media data stream 14.

Specific media data stream 14 may be obtained 204 from server computer 26 using a networking protocol chosen from the group consisting of: a Real Time Streaming Protocol (RTSP); a Real-time Transport Protocol (RTP); and a User Datagram Protocol (UDP).

While the above-described remote distribution server computer and the above-described on-demand media server computer are described as being a single server computer (e.g., server computer 26), this is for illustrative purposes only and is not intended to be a limitation of this disclosure. Specifically and as discussed above, server computer 26 may include but is not limited to: a personal computer, a server computer, and a plurality of server computers. Accordingly, the above-described remote distribution server computer and the above-described on-demand media server computer may be separate server computers. Additionally/alternatively, one or both of the above-described remote distribution server computer and the above-described on-demand media server computer may each be a plurality of server computers.

Specific media data file portion 196 may be sampled at a first bit rate and specific media data stream 14 may be sampled at a second bit rate. And the first bit rate may be less than the second bit rate to allow for more efficient transfer of plurality of specific media data file portions 12 from e.g., server computer 26 to personal media device 36. For example, specific media data file portion 196 may have a bit rate of 64 kilobits per second (kps) while specific media data stream 14 may have a bit rate of 128 kps. Accordingly, by using a 64 kps bit rate on specific media data file portion 196, the size of specific media data file portion 196 is reduced by 50% (with respect to the 128 kps bit rate used on specific media data stream 14. Accordingly specific media data file portion 196 may be more quickly downloadable onto personal media device 36. Additionally/alternatively, specific media data stream 14 may be available (from server computer 26) at multiple bit rates, thus allowing for network bandwidth adaptation.

The specific media data file portion (e.g., specific media data file portion 196) may be chronologically sized so that the rendering time of the specific media data file portion may be at least as long as the anticipated time required to obtain the related specific media data stream (e.g., specific media data stream 14). For example, if the average time required for personal media device 36 to access server computer 26 (via wireless communication channel 50 and network 28 and/or network 30) is ten seconds with the range spanning from five seconds (i.e., the quickest time) to twenty seconds (i.e., the slowest time), the chronological length may be configured to thirty seconds. Accordingly, by configuring specific media data file portion 196 so that it is thirty seconds long, specific media data file portion 196 is long enough so that specific media data stream 14 may be obtained 204 within the rendering time of specific media data file portion 196, provided media data process 10 initiates the process of obtaining 204 specific media data stream 14 shortly after media data process 10 begins rendering specific media data file process 195.

Figure 5:
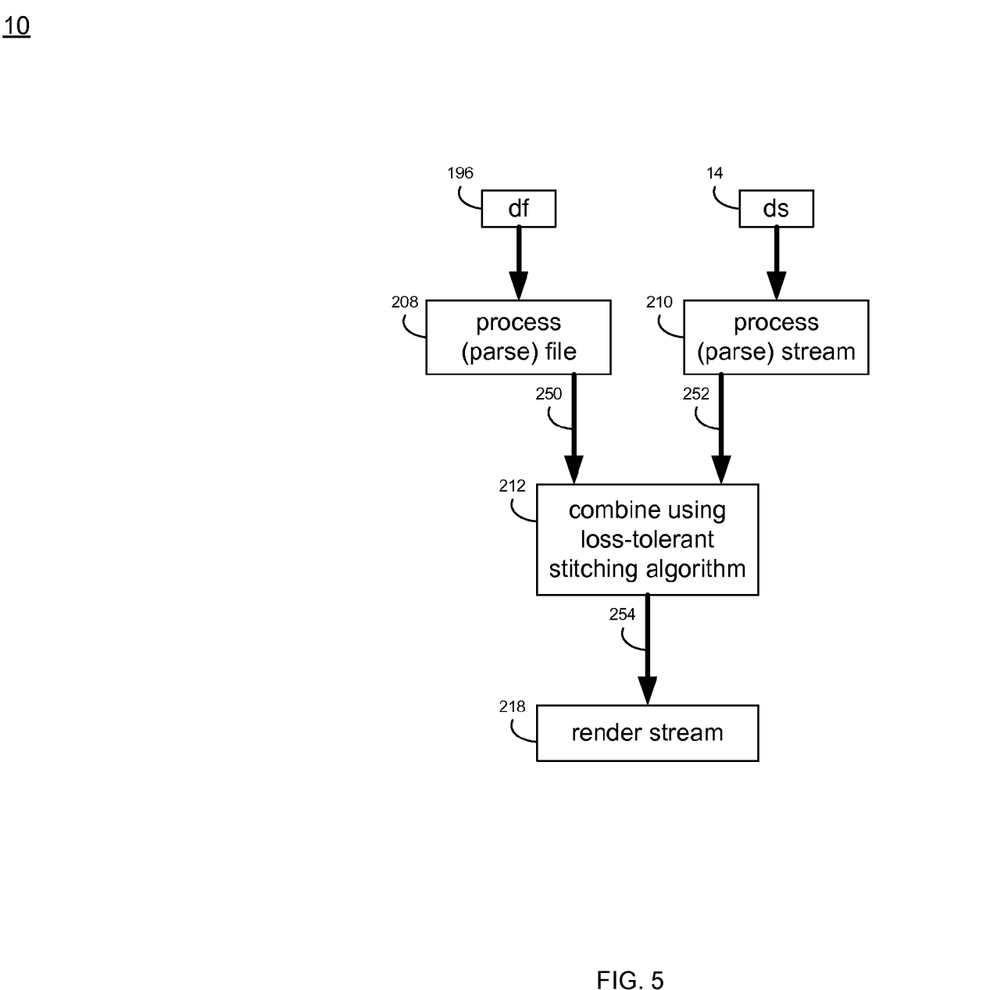
FIG. 5 is a diagrammatic view of a portion of the media data process of FIG. 1.

At least a portion of specific media data file portion 196 and at least a portion of the specific media data stream 14 may be combined and rendered 206 by media data process 10. Referring also to FIG. 5, when rendering 206 specific media data file portion 196 and specific media data stream 14, media data process 10 may process 208 specific media data file portion 196 to generate first normalized packetized stream 250. Media data process 10 may also process 210 specific media data stream 14 to generate second normalized packetized stream 252. First normalized packetized stream 250 and second normalized packetized stream 252 may have equally sized data packets (e.g., 1 kilobyte)

When processing 208 specific media data file portion 196 to generate first normalized packetized stream 250, media data process 10 may parse specific media data file portion 196 and break specific media data file portion 196 into a plurality of data packets, thus generating first normalized packetized stream 250. Further, when processing 210 specific media data stream 14 to generate second normalized packetized stream 252, media data process 10 may parse 216 specific media data stream 14 to break specific media data stream 14 into a plurality of data packets, thus generating second normalized packetized stream 252.

Once first and second normalized packetized stream 250, 252 are generated, media data process 10 may combine 212, using a packet loss-tolerant stitching algorithm, at least a portion of first normalized packetized stream 250 and at least a portion of second normalized packetized stream 252 to generate loss-compensated media data stream 254. An example of loss-compensated media data stream 254 may include but is not limited to an A/V loss-compensated media data stream of news story "Fine Dining in NYC".

For the purposes of this disclosure, a packet loss-tolerant algorithm is defined as any algorithm that allows for the reassembly and rendering of a sequential series of data packets even though one or more of the data packets within the series is missing. For example, assume for illustrative purposes that when processing 208, 210 specific media data file portion 196 and specific media data stream 14 (respectively) of news story "Fine Dining in NYC", the resulting story should be 2,000 packets in length. However, assume that packets P53, P128 and P724 are missing. Accordingly, using the above-described packet loss-tolerant switching algorithm, media data process 10 may assemble new story "Fine Dining in NYC" from 1,997 packets, namely packets P1-P52, P54-P127, P129-P723, and P725-P2000. Accordingly, when news story "Fine Dining in NYC" is rendered by media data process 10 on personal media device 36, three packets may be skipped and one or more artifacts may appear within the rendered news story "Fine Dining in NYC".

When rendering 206 specific media data file portion 196 and specific media data stream 14, media data process 10 may render 218 the loss-compensated media data stream on client electronic device 36.

Continuing with the above-stated example in which specific media data file portion 196 is the first thirty seconds of the "Fine Dining in NYC" news story and specific media data stream 14 is the last two and a half minutes of the same story, once specific media data stream 14 is obtained 204, specific media data file portion 196 may be combined with specific media data stream 14 to form the entire three-minute news story entitled "Fine Dining in NYC". The point at which specific media data file portion 196 is combined with specific media data stream 14 may vary depending on the manner in which media data process 10 is implemented. For example and as discussed above, the bit rate of specific media data file portion 196 may be lower than the bit rate of specific media data stream 14. Accordingly, media data process 10 may be implemented to switch from specific media data file portion 196 to specific media data stream 14 as quickly as possible, thus increasing the overall quality of news story "Fine Dining in NYC". Alternatively, media data process 10 may be configured to completely render specific media data file portion 196 prior to switching to specific media data stream 14.

A number of implementations have been described. Nevertheless, it will be understood that various modifications may be made. Accordingly, other implementations are within the scope of the following claims.

What is claimed is:

1. A method comprising:
receiving a plurality of media data file portions on a client electronic device from a remote distribution server computer, wherein each media data file portion is associated with a media data stream;
allowing a user to select a specific media data file portion for rendering, wherein the specific media data file portion is chosen from the plurality of media data file portions;
upon the user selecting the specific media data file portion, rendering at least a portion of the specific media data file portion and obtaining a specific media data stream associated with the specific media data file portion from an on-demand media server computer and rendering at least a portion of the specific media data stream;
wherein rendering at least a portion of the specific media data file portion and at least a portion of the specific media data stream includes:
processing the specific media data file portion to generate a first normalized packetized stream;
processing the specific media data stream to generate a second normalized packetized stream; and
combining, using a packet loss tolerant stitching algorithm, at least a portion of the first normalized packetized stream and at least a portion of the second normalized packetized stream to generate a loss-compensated media data stream.

2. The method of claim 1 wherein receiving the plurality of media data file portions on the client electronic device from the remote distribution server computer includes:
receiving the plurality of media data file portions on the client electronic device from the remote distribution server computer during a low-bandwidth usage time frame.

3. The method of claim 1 wherein the specific media data file portion is an initial chronological portion of a larger media data file and the specific media data stream is a stream of a residual chronological portion of the larger media data file.

4. The method of claim 1 wherein the specific media data file portion is chronologically sized so that a rendering time of the specific media data file portion is at least as long as an anticipated time required to obtain the specific media data stream.

5. The method of claim 1 wherein rendering at least a portion of the specific media data file portion and at least a portion of the specific media data stream further includes:
rendering the loss-compensated media data stream on the client electronic device.

6. The method of claim 1 wherein the loss-compensated media data stream includes an A/V loss-compensated media data stream.

7. The method of claim 1 wherein the client electronic device is chosen from the group consisting of: a personal computer; a laptop computer; a notebook computer; a personal media device; a personal digital assistant; a data-enabled cellular telephone; a television; a cable box; an internet radio; and a dedicated network device.

8. The method of claim 1 wherein the specific media data file portion is sampled at a first bit rate and the specific media data stream is sampled at a second bit rate, wherein the first bit rate is less than the second bit rate.

9. The method of claim 1 wherein the specific media data file portion is obtained from the remote distribution server computer using a networking protocol chosen from the group consisting of:
a Multimedia Messaging Service (MMS) protocol;
a HyperText Transfer Protocol (HTTP); a FLUTE protocol; and
a Really Simple Syndication (RSS) protocol.

10. The method of claim 1 wherein the specific media data stream is obtained from the on-demand media server computer using a networking protocol chosen from the group consisting of:
- a Real Time Streaming Protocol (RTSP);
- a Real-time Transport Protocol (RTP); and
- a User Datagram Protocol (UDP).

11. The method of claim 1 wherein the specific media data file portion includes metadata that defines a location of the specific media data stream.

12. The method of claim 1 wherein the remote distribution server computer and the on-demand media server computer are a single server computer.

13. A computer program product residing on a computer readable medium having a plurality of instructions stored thereon which, when executed by a processor, cause the processor to perform operations comprising:

receiving a plurality of media data file portions on a client electronic device from a remote distribution server computer, wherein each media data file portion is associated with a media data stream;

allowing a user to select a specific media data file portion for rendering, wherein the specific media data file portion is chosen from the plurality of media data file portions; and upon the user selecting the specific media data file portion, rendering at least a portion of the specific media data file portion and obtaining a specific media data stream associated with the specific media data file portion from an on-demand media server computer and rendering at least a portion of the specific media data stream;

wherein the instructions for rendering at least a portion of the specific media data file portion and at least a portion of the specific media data stream include instructions for:

processing the specific media data file portion to generate a first normalized packetized stream;

processing the specific media data stream to generate a second normalized packetized stream; and combining, using a packet loss tolerant stitching algorithm, at least a portion of the first normalized packetized stream and at least a portion of the second normalized packetized stream to generate a loss-compensated media data stream.

14. The computer program product of claim 13 wherein the instructions for receiving the plurality of media data file portions on the client electronic device from the remote distribution server computer include instructions for:

receiving the plurality of media data file portions on the client electronic device from the remote distribution server computer during a low-bandwidth usage time frame.

15. The computer program product of claim 13 wherein the specific media data file portion is an initial chronological portion of a larger media data file and the specific media data stream is a stream of a residual chronological portion of the larger media data file.

16. The computer program product of claim 13 wherein the specific media data file portion is chronologically sized so that a rendering time of the specific media data file portion is at least as long as an anticipated time required to obtain the specific media data stream.

17. The computer program product of claim 13 wherein the instructions for rendering at least a portion of the specific media data file portion and at least a portion of the specific media data stream further include instructions for:

rendering the loss-compensated media data stream on the client electronic device.

18. The computer program product of claim 13 wherein the loss-compensated media data stream includes an A/V loss-compensated media data stream.

19. The computer program product of claim 13 wherein the client electronic device is chosen from the group consisting of: a personal computer; a laptop computer; a notebook computer; a personal media device; a personal digital assistant; a data-enabled cellular telephone; a television; a cable box; an internet radio; and a dedicated network device.

20. The computer program product of claim 13 wherein the specific media data file portion is sampled at a first bit rate and the specific media data stream is sampled at a second bit rate, wherein the first bit rate is less than the second bit rate.

21. The computer program product of claim 13 wherein the specific media data file portion is obtained from the remote distribution server computer using a networking protocol chosen from the group consisting of:
- a Multimedia Messaging Service (MMS) protocol;
- a HyperText Transfer Protocol (HTTP); a FLUTE protocol; and
- a Really Simple Syndication (RSS) protocol.

22. The computer program product of claim 13 wherein the specific media data stream is obtained from the on-demand media server computer using a networking protocol chosen from the group consisting of:
- a Real Time Streaming Protocol (RTSP); a Real-time Transport Protocol (RTP); and a User Datagram Protocol (UDP).

23. The computer program product of claim 13 wherein the specific media data file portion includes metadata that defines a location of the specific media data stream.

24. The computer program product of claim 13 wherein the remote distribution server computer and the on-demand media server computer are a single server computer.

25. The method according to claim 1, wherein the first and second normalized packetized streams are processed to have equally sized data packets.

26. The computer program product of claim 13, wherein the instructions to generate the first and second normalized packetized streams generate packetized streams having equally sized data packets.

* * * * *